US012521643B2

(12) United States Patent
Xu et al.

(10) Patent No.: US 12,521,643 B2
(45) Date of Patent: Jan. 13, 2026

(54) SYSTEM FOR PREPARING NEW ENERGY Ni—Co—Mn RAW MATERIAL FROM LATERITE NICKEL ORE

(71) Applicants: PT QMB NEW ENERGY MATERIALS, Dki Jakarta (ID); PT ESG NEW ENERGY MATERIAL, Dki Jakarta (ID); GEM CO., LTD., Guangdong (CN); PT GEM INDONESIA NEW ENERGY MATERIALS, Dki Jakarta (ID)

(72) Inventors: Kaihua Xu, Guangdong (CN); Satryo Soemantri Brodjonegoro, Dki Jakarta (ID); Yaguang Peng, Dki Jakarta (ID); Tegar Mukti Aji, Dki Jakarta (ID); Rizky Wanaldi, Dki Jakarta (ID); Andi Syaputra Hasibuan, Dki Jakarta (ID); Evan Wahyu Kristiyanto, Dki Jakarta (ID); Aad Alief Rasyidi Baking, Dki Jakarta (ID); Arnaldo Marulitua Sinaga, Dki Jakarta (ID)

(73) Assignees: GEM CO., LTD., Shenzhen (CN); PT GEM INDONESIA NEW ENERGY MATERIALS

( * ) Notice: Subject to any disclaimer, the term of this patent is extended or adjusted under 35 U.S.C. 154(b) by 0 days.

(21) Appl. No.: 18/870,462

(22) PCT Filed: Jul. 3, 2023

(86) PCT No.: PCT/CN2023/105481
§ 371 (c)(1),
(2) Date: Nov. 29, 2024

(87) PCT Pub. No.: WO2025/007233
PCT Pub. Date: Jan. 9, 2025

(65) Prior Publication Data
US 2025/0161837 A1 May 22, 2025

(51) Int. Cl.
*B01D 3/06* (2006.01)
*C22B 1/02* (2006.01)
(Continued)

(52) U.S. Cl.
CPC ............... *B01D 3/065* (2013.01); *C22B 1/02* (2013.01); *C22B 1/24* (2013.01); *C22B 3/02* (2013.01);
(Continued)

(58) Field of Classification Search
None
See application file for complete search history.

(56) References Cited

FOREIGN PATENT DOCUMENTS

| CN | 107579218 A | 1/2018 |
|---|---|---|
| CN | 109052492 A | 12/2018 |

(Continued)

OTHER PUBLICATIONS

WO 2023273264 A1 machine translation, originally published Jan. 5, 2023, machine translated Apr. 10, 2025 (Year: 2023).*
(Continued)

*Primary Examiner* — Keith D. Hendricks
*Assistant Examiner* — Nikolas Takuya Pullen

(57) ABSTRACT

The present disclosure discloses a system for preparing new energy Ni—Co—Mn raw material from laterite nickel Ore. The system includes a raw auxiliary material supply module, a leaching reaction module, a neutralization and purification module, a neutralization and purification module, a Ni—Co—Mn mixed hydroxide synthesis module, a valuable metal recovery module, a crystal manufacturing module, a ternary precursor manufacturing module, and a ternary positive material manufacturing module. The present disclosure overcomes the defects of prior art and process, and is a green technology and process for simultaneous extraction of nickel, cobalt and manganese from low-grade laterite nickel
(Continued)

ore, which not only realizes simultaneous and efficient extraction of nickel, cobalt and manganese, but also adopts energy-saving and emission reduction green technology and clean production technology to effectively recycle and safely dispose of waste water, waste residue and waste gas.

16 Claims, 5 Drawing Sheets

(51) Int. Cl.
*C22B 1/24* (2006.01)
*C22B 3/02* (2006.01)
*C22B 15/00* (2006.01)
*C22B 19/20* (2006.01)
*C22B 47/00* (2006.01)
*C22B 59/00* (2006.01)

(52) U.S. Cl.
CPC ...... *C22B 15/0006* (2013.01); *C22B 15/0065* (2013.01); *C22B 15/0089* (2013.01); *C22B 19/20* (2013.01); *C22B 47/00* (2013.01); *C22B 59/00* (2013.01)

(56) References Cited

FOREIGN PATENT DOCUMENTS

| | | |
|---|---|---|
| CN | 113060712 A | 7/2021 |
| CN | 115818732 A | 3/2023 |
| CN | 103545504 A | 1/2024 |
| WO | 2020019918 A1 | 1/2020 |
| WO | 2020019920 A1 | 1/2020 |
| WO | 2023273264 A1 | 1/2023 |

OTHER PUBLICATIONS

CN 107579218 A machine translation, originally published Jan. 12, 2018, machine translated Apr. 10, 2025 (Year: 2018).*
CN 103545504 B machine translation, originally published Jan. 20, 2016, machine translated Apr. 10, 2025 (Year: 2016).*
International Search Report issued in corresponding International application No. PCT/CN2023/105481, mailed Dec. 5, 2023 (10 pages).
Written Opinion of the International Search Authority in corresponding International application No. PCT/CN2023/105481, mailed Dec. 5, 2023 (8 pages).

* cited by examiner

SYSTEM FOR PREPARING NEW ENERGY Ni—Co—Mn RAW MATERIAL FROM LATERITE NICKEL ORE

FIELD OF THE DISCLOSURE

The present disclosure relates to the technical field of metallurgical technology and new energy materials, and in particularly to a system for preparing new energy Ni—Co—Mn raw material from laterite nickel ore.

BACKGROUND

With the development of battery and energy storage technologies, types of batteries become more and more. Batteries made of different materials continuously extend their market contact by virtue of their respective advantages, wherein a ternary lithium battery is a power lithium battery that occupies a mainstream position in the field of new energy vehicles. Because of the advantages of high energy density and good low-temperature performance, the ternary lithium battery is a dynamic choice for long-term mileage and high-grade vehicles, and demonstrating good market prospects.

Ternary lithium battery, as the name suggests, is mainly composed of nickel, cobalt and manganese three elements of the battery. The upstream of the industry chain of the ternary lithium battery includes three elements: nickel, cobalt, manganese mineral resources, nickel and manganese ternary raw materials, and ternary precursors (also known as ternary "core" and ternary "cell"). The mid-stream includes ternary lithium battery ternary cathode material, diaphragm, electrolyte, and negative electrode material. The downstream includes ternary battery cell, BMS and PACK. Nickel, cobalt and manganese minerals and raw materials have become the key elements restricting the cost and development of ternary new energy. Especially nickel resources and nickel raw materials are crucial to high-capacity ternary batteries. The high nickel is equal to high capacity and long duration. Ultra-high nickel ternary materials containing more than 55% nickel can support more than 800 kilometers of driving range. With the development of global electrification, nickel has become a global scarce resource.

The laterite nickels ore are located in the tropical mining area between north and south latitudes 22°, and contain three elements: nickel and cobalt manganese, especially low-grade laterite nickel ore containing less than 1.3% nickel, the proportion thereof the clay is 10:(0.6-1.5):(1.0-5.0), which is the perfect formula for high-nickel and low-cobalt ternary materials and is a gift from nature. However, for a long time, conventionally smelting technologies only focus on nickel extraction or nickel-cobalt extraction, and do not consider synchronous extraction of nickel-cobalt manganese, which causes great waste of resources.

For example, the patent application CN113564383A discloses a system and technology of two-stage pressure extraction of nickel and cobalt from laterite nickel ore, including: a high-pressure acid leaching apparatus, configured to perform high-temperature high-pressure acid leaching of limonite-type laterite nickel ore, wherein the high-pressure acid leaching apparatus has a limonite-type laterite nickel ore pulp inlet, a sulfuric acid inlet, and a post-leaching pulp outlet; a high-pressure neutralization unit, configured to perform a high-temperature high-pressure neutralization processing on the high-pressure acid-immersed pulp, wherein the high-pressure neutralization unit includes a high-pressure acid-immersed pulp inlet, a serpentine-type laterite nickel ore pulp inlet, a high-pressure neutralized liquid outlet, and a high-pressure neutralized bottom stream outlet; a neutralization removing unit configured to perform neutralization removing processing on the high-pressure neutralization processed pulp, wherein the neutralization removing unit includes a high-pressure neutralization post-liquid inlet, a neutralization post-liquid outlet, and a neutralization post-liquid outlet; a nickel-cobalt precipitation unit, configured to perform precipitation processing on a neutralized-removed liquid, wherein the nickel-cobalt precipitation unit has a neutralized-removed liquid inlet, a precipitator inlet, a precipitated liquid outlet, and a nickel-cobalt concentration outlet. The system and a process based on the system obtain nickel-cobalt enrichment.

The conventional laterite nickel ore extraction processing system module is not highly integrated, can only produce nickel-cobalt raw materials by smelting way, and focuses on extracting nickel and cobalt, but does not recovery manganese. In addition, the processing equipment cannot extract Ni—Co—Mn at the same time and only obtain coarse nickel-hydroxide cobalt that cannot be directly used to prepare a ternary precursor, and further synthesize a ternary positive electrode material. The conventional laterite nickel ore extraction processing system does not involve an overall design and modular management of environmental protection treatment (waste water, slag and gas), steam reuse, and automation control equipment.

SUMMARY

The purpose of this disclosure is to provide a system for preparing new energy Ni—Co—Mn raw materials from laterite nickel ore, so as to solve the problem that existing system is not highly integrated, only using the laterite nickel ore to produce nickel-cobalt mixed hydroxide, cannot continuously produce ternary positive material, only focus on extracting nickel and cobalt, and cannot simultaneously extract nickel, cobalt, and manganese, which causes waste of resources and energy.

To achieve the foregoing technical objective, a technical solution of the present disclosure provides system for preparing new energy Ni—Co—Mn raw material from laterite nickel ore, comprising: a raw auxiliary material supply module, comprising an ore blending unit, an ore washing unit, an ore dressing unit, an ore grinding unit, and a concentration unit connected in series, and further comprising a neutralizer preparation unit, an acid preparation unit, and a precipitation accelerator preparation unit, wherein the ore blending unit is configured to blend an ore of a required grade, the ore washing unit is configured to wash the ore, the ore dressing unit is configured to separate chromium iron oxide from the ore, the grinding unit is configured to grind the ore into a required particle size to obtain a pulp, and the concentration unit is configured to concentrate the pulp; a leaching reaction module, comprising a multi-level preheating unit, a high-pressure/oxygen-pressure reactor unit, and a multi-level flash distillation unit connected in series, wherein the multi-level preheating unit is connected to the concentration unit and configured to perform a multi-level preheating on the pulp, the high-pressure/oxygen-pressure reactor unit is further connected to the acid preparation unit and configured to leach minerals in the pulp, and the multi-level flash distillation unit is configured to perform a multi-level pressure and temperature lowering on leach solution; a neutralization and purification module, comprising a cyclic leaching pulp neutralization unit, a multi-stage countercurrent washing unit and a multi-segment Fe—Cr—

Al removing unit, wherein the cyclic leaching pulp neutralization unit is connected to the multi-stage flash distillation unit and the neutralizer preparation unit, and is configured to neutralize the leach solution of the multi-stage flash distillation unit; the multi-stage countercurrent washing unit is connected to the cyclic leaching pulp neutralization unit, and is configured to wash the neutralized leach solution; and the multi-stage Fe—Cr—Al removing unit is connected to the multi-stage countercurrent washing unit, the cyclic leaching pulp neutralization unit, and the neutralizer preparation unit, and is configured to remove impurities from the washed leach solution, and transporting slag phase that is generated during removing the impurities into the multi-stage countercurrent washing unit and the cyclic leaching pulp neutralization unit; a Ni—Co—Mn mixed hydroxide synthesis module, comprising a Ni—Co—Mn mixed hydroxide multi-stage synthesis unit and a Ni—Co—Mn mixed hydroxide product packaging unit, wherein the Ni—Co—Mn mixed hydroxide multi-stage synthesis unit is connected to the multi-stage Fe—Cr—Al removing unit and the neutralizer preparation unit, and is configured to precipitate nickel, cobalt, and manganese from the leach solution after removing the impurities; the Ni—Co—Mn mixed hydroxide product packaging unit is connected to the Ni—Co—Mn mixed hydroxide multi-stage synthesis unit, and is configured to package the precipitate; a valuable metal recovery module, comprising a manganese, copper, zinc, and scandium recovery unit, and the manganese, copper, zinc, and scandium recovery unit is connected to the multiple-segment Fe—Cr—Al removing unit and the Ni—Co—Mn mixed hydroxide multi-segment synthesis unit, and configured to recovery valuable metals such as manganese, copper, zinc, and scandium; a crystal manufacturing module, comprising a Ni—Co—Mn mixed salt crystal manufacturing unit, a nickel-salt crystal manufacturing unit, a cobalt-salt crystal manufacturing unit, and a manganese-salt crystal manufacturing unit, wherein the Ni—Co—Mn mixed salt crystal manufacturing unit is connected to the multi-stage Fe—Cr—Al removing unit and the Ni—Co—Mn mixed hydroxide multi-stage synthesis unit, and is configured to extract liquid phase to obtain a Ni—Co—Mn mixed salt crystal, wherein the nickel-salt crystal manufacturing unit, the cobalt-salt crystal manufacturing unit, and the manganese-salt crystal manufacturing unit are connected to the multi-stage iron-chromium removing unit and the Ni—Co—Mn mixed hydroxide multi-stage synthesis unit, and is configured to extract the liquid phase to obtain a nickel-salt crystal, a cobalt-salt crystal, and a manganese-salt crystal; and a ternary precursor manufacturing module, comprising a material preparation unit, a control precipitation reaction unit, and a ternary precursor post-processing unit connected in series, wherein the material preparation unit is connected to the Ni—Co—Mn mixed salt crystal manufacturing unit, the nickel-salt crystal manufacturing unit, the cobalt-salt crystal manufacturing unit, and the manganese-salt crystal manufacturing unit, and is configured to prepare a metal salt solution, an alkali liquid, and a complexing agent, the control precipitation reaction unit is configured to react with the metal salt solution, the alkali liquid, and the complexing agent, and the ternary precursor post-processing unit is configured to process the reacted material to obtain a ternary precursor product; the ternary positive material preparation module, comprising a lithium mixed charging unit, a high-temperature synthesis unit, and a ternary positive material post-processing unit connected in series, wherein the lithium mixed charging unit is connected to the ternary precursor post-processing unit, and is configured to mix the ternary precursor product with lithium source, the high-temperature synthesis unit is configured to perform a high-temperature synthesis on the mixed material, and the ternary positive material post-processing unit is configured to crush the material obtained after high-temperature synthesis and remove magnetic foreign material from the crushed material.

Further, the multi-stage preheating unit comprises a first preheater, a second preheater, and a third preheater connected in series, wherein the first preheater is connected to the concentration unit, the third preheater is connected to the high-pressure/oxygen-pressure reactor unit, and the first preheater, the second preheater, and the third preheater are configured to perform a step-by-step preheating on the pulp output from the concentration unit.

Further, the multi-stage flash distillation unit comprises a first flash evaporator, a second flash evaporator, and a third flash evaporator, wherein the first flash evaporator is connected to the high-pressure/oxygen-pressure reactor unit, the third flash evaporator is connected to the cyclic leaching pulp neutralization unit, and the first flash evaporator, the second flash evaporator, and the third flash evaporator are configured to perform a step-by-step pressure and temperature lowering on the leach solution leached from the high-pressure/oxygen-pressure reactor unit.

Further, the first flash evaporator is connected to the third preheater, and configured to preheat the pulp in the third preheater by flash steam; and the second flash evaporator is connected to the second preheater, and configured to preheat the pulp in the second preheater by flash steam, and the third flash evaporator is connected to the first preheater and configured to preheat the pulp in the first preheater by flash steam.

Further, wherein volumes of the first flash evaporator, the second flash evaporator, and the third flash evaporator increase in order, and setting heights of the first flash evaporator, the second flash evaporator, and the third flash evaporator decreases in order; and setting heights of the third preheater, the second preheater, and the first preheater decreases in order.

Further, the multi-segment Fe—Cr—Al removing unit comprises multiple segments of Fe—Cr—Al removing subunits connected in series, each Fe—Cr—Al removing subunit is connected to the neutralizer preparation unit, and configured to neutralize and remove the impurities for each iron-aluminum chromium removing unit, wherein a first segment of the Fe—Cr—Al removing unit is connected to the multi-stage counter-current washing unit, and configured to perform a purification on the washed leach solution, and transport the slag phase generated during the purification into the multi-stage counter-current washing unit; and the remaining Fe—Cr—Al removing subunit is connected to the cyclic leaching pulp neutralization unit, and configured to perform another purification on the leach solution obtained from a previous Fe—Cr—Al removing subunit, and transport the slag phase generated during the purification into the cyclic leaching pulp neutralization unit.

Further, a pH value of each of the Fe—Cr—Al removing subunits is gradually increased.

Further, a last segment of the Fe—Cr—Al removing subunit is connected to the manganese, copper, zinc, scandium recovery unit for recovering copper, zinc, and scandium elements in the purified slurry.

Further, the Ni—Co—Mn mixed hydroxide multi-stage synthesis unit comprises multiple segments of Ni—Co—Mn mixed hydroxide synthesis subunits connected in series, each Ni—Co—Mn mixed hydroxide synthesis subunit is connected to the neutralizer preparation unit, a first segment of the Ni—Co—Mn mixed hydroxide synthesis subunit is connected to a last segment of the Ni—Co—Mn mixed hydroxide synthesis subunit, and is configured to precipitate nickel, cobalt, and manganese in the impurity-removed leach solution, and transport generated slag phase into the crystal manufacturing module, and the last stage of the Ni—Co—Mn mixed hydroxide synthesis subunit is connected to the neutralizer preparation unit, and is configured to transport the generated slag phase into the neutralizer preparation unit, the remaining segments of the Ni—Co—Mn mixed hydroxide synthesis subunits are connected to the manganese, copper, zinc, and scandium recovery unit, and configured to recycle manganese elements in the slag phase.

Further, the system further comprising an environmental protection and safety module, wherein the environmental protection and safety module comprises a waste water processing unit connected to a Ni—Co—Mn mixed hydroxide multi-stage synthesis unit, and configured to purify waste water generated therefrom.

Further, the environment protection and safety module further comprises an exhaust gas processing unit, and the exhaust gas processing unit is connected to the first preheater, configured to purify exhaust gas generated by the first preheater.

Further, the environment protection and safety module further comprises a tailing slag processing unit connected to the multi-stage countercurrent washing unit for neutralizing the tailing slag.

Further, the environmental protection and safety module further comprises a fire protection unit configured to provide a fire protection service.

Further, the system further comprising an energy supply module, wherein the energy supply module comprises a pure water preparation unit, and the pure water preparation unit is connected to the multi-stage countercurrent washing unit and the ore washing unit, and configured to supply water to the multi-stage countercurrent washing unit and the ore washing unit.

Further, the energy supply module further comprises a boiler unit, the boiler unit is connected to the high pressure/oxygen pressure reactor unit configured to provide high pressure steam to the high pressure/oxygen pressure reactor unit.

Further, the energy supply module further comprises a distribution unit connected to the other units to provide electrical energy.

Further, the energy supply module further comprises a DCS integrated control unit connected to other units to control operating states of the other units.

Compared with the prior art, beneficial effects of the present disclosure include:

The present disclosure provides a system for preparing new energy Ni—Co—Mn raw material from laterite nickel Ore. In this system, multiple process steps such as supply of a raw auxiliary material, leaching reaction, neutralization and removal of impurities, Ni—Co—Mn mixed hydroxide synthesis, crystal production, ternary precursor production, and ternary cathode material production are modularized, so that removal efficiency of impurity metal elements such as iron, aluminum, and chromium is significantly improved. In addition, high-efficiency extraction of nickel-cobalt manganese is implemented, and resources such as copper, zinc, scandium, iron, and chromium are comprehensively recovered. The obtained Ni—Co—Mn salt crystal can be directly used for preparing ternary precursors, so that production costs are significantly reduced. The present disclosure overcomes a disadvantage of the prior art and a process. A green technology and a process for simultaneously extracting nickel and cobalt and manganese from a low-grade laterite nickel ore are not only used to simultaneously and efficiently extract nickel and cobalt and manganese, but also a green technology and a clean production process for energy saving and emission reduction are used to effectively and safely dispose of waste water, waste residue, and waste gas. The present disclosure has energy saving and carbon reducing and pollution reduction, and implements maximum comprehensive recovery of nickel and cobalt and manganese, effectively resolves a contradiction between a requirement of a new energy source and a scarce resource of nickel and manganese strategy, and completely meets a global green development and a dual-carbon economic trend.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The following describes a preferred embodiment of the present disclosure in detail with reference to the accompanying drawings, where the accompanying drawings constitute a part of the cost application, and together with the embodiments of the present disclosure are used to explain the principles of the present disclosure, and are not intended to limit the scope of the present disclosure.

Under the trend of green and intelligent industrial transformation in the world, we should take the lead in green development in the world. The campus is based on the standards of "greening, security, science and technology, quality, wisdom and education". Each area of the campus is based on the principles of "process, automation, cleanliness, security, information and education". As the planning, construction and operation standards of the campus, we should guide the operation, production, work and life of the campus to meet the requirements of relevant laws and regulations related to environmental protection and security in the world.

Figure 1:
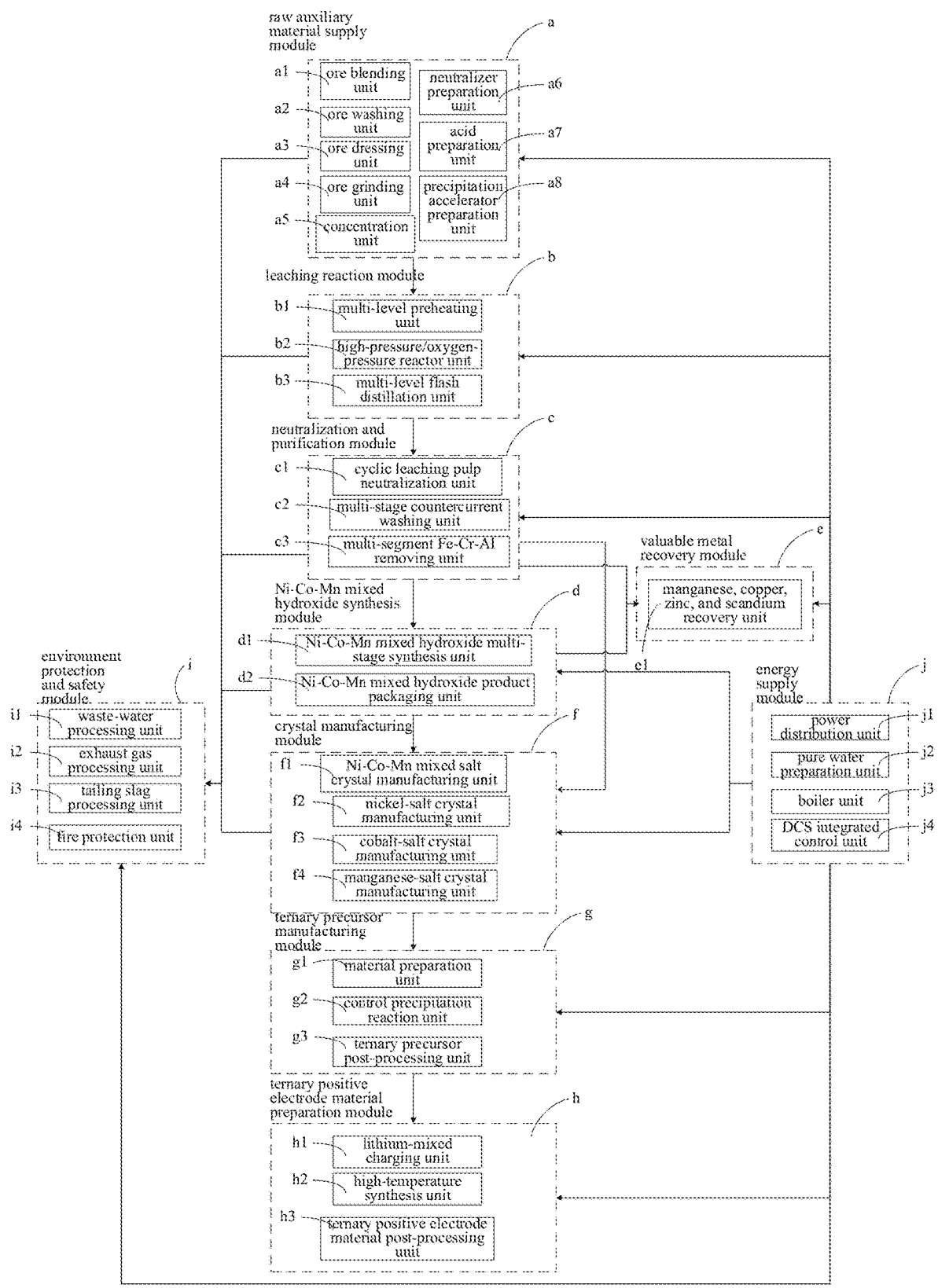
FIG. 1 is a block diagram of a system for preparing new energy Ni—Co—Mn raw material from laterite nickel ore, according to an embodiment of the present disclosure.
Figure 2:
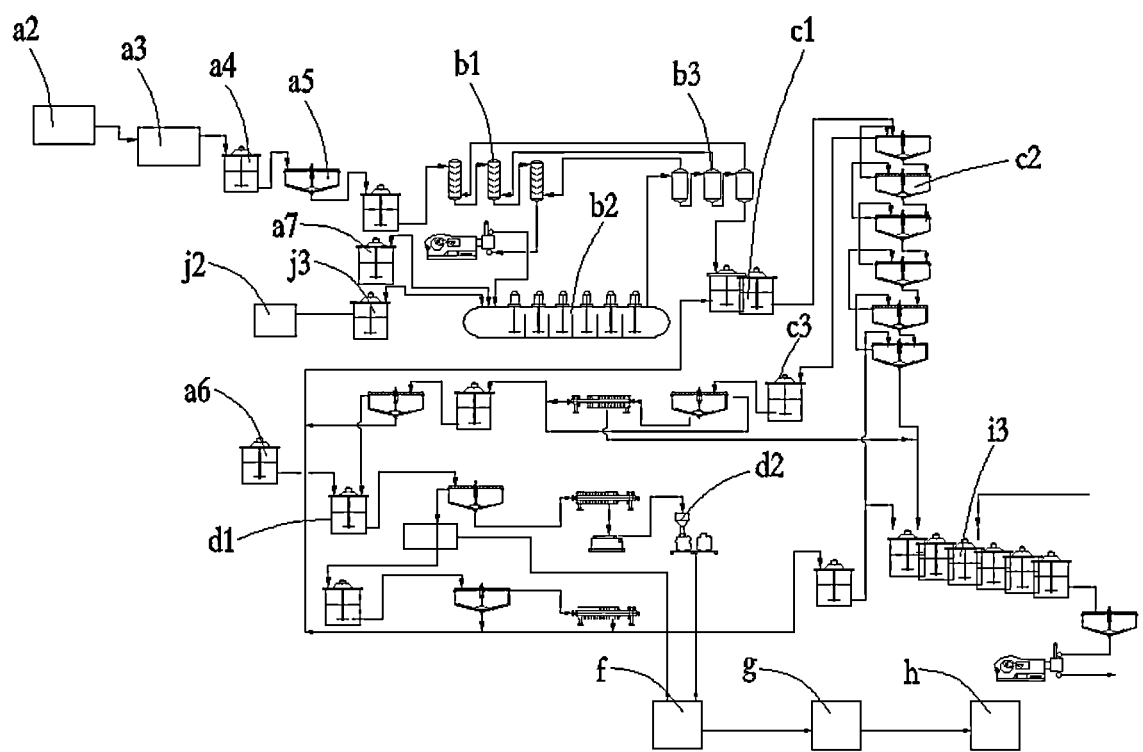
FIG. 2 is a schematic view of the system for preparing new energy Ni—Co—Mn raw material from laterite nickel ore according to an embodiment of the present disclosure.
Figure 3:
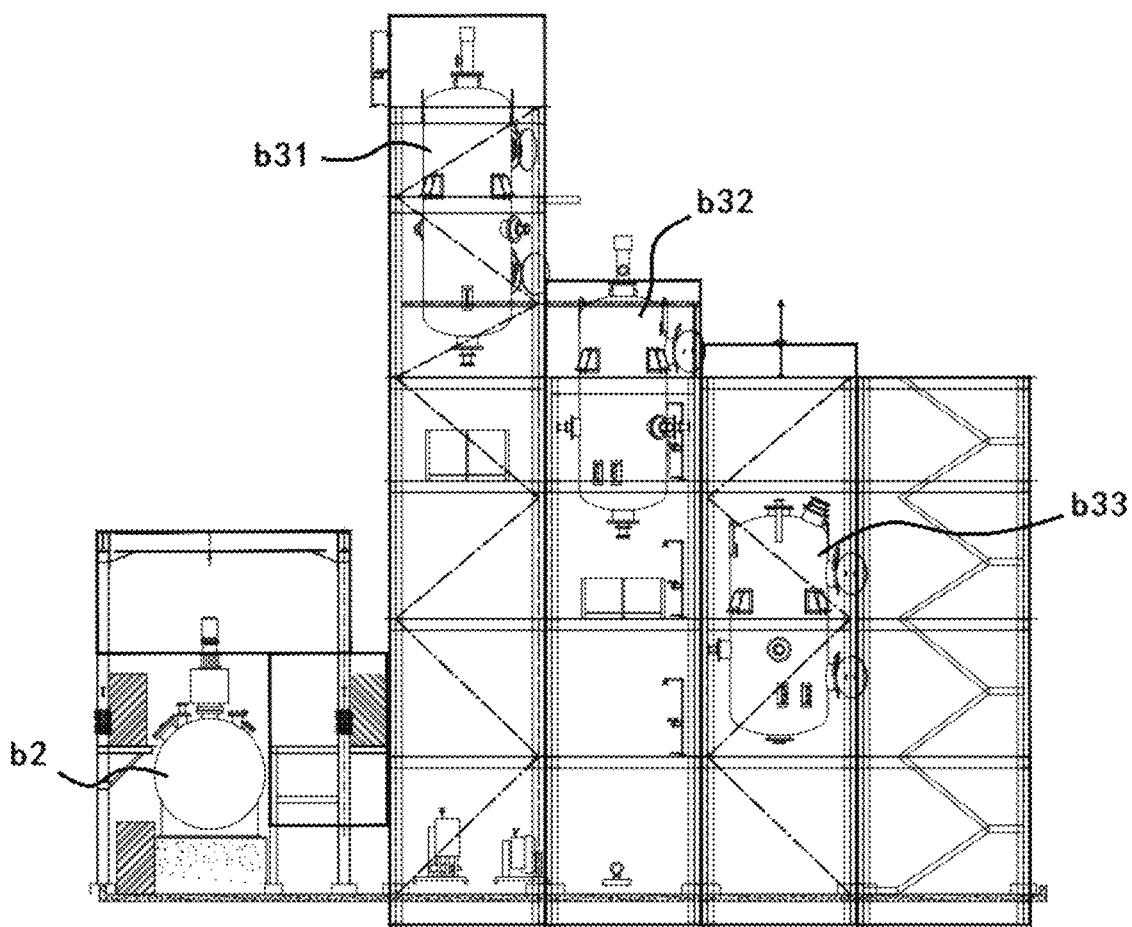
FIG. 3 is a first schematic view partially showing a leaching reaction module of the system for preparing new energy Ni—Co—Mn raw material from laterite nickel ore, according to an embodiment of the present disclosure.
Figure 4:
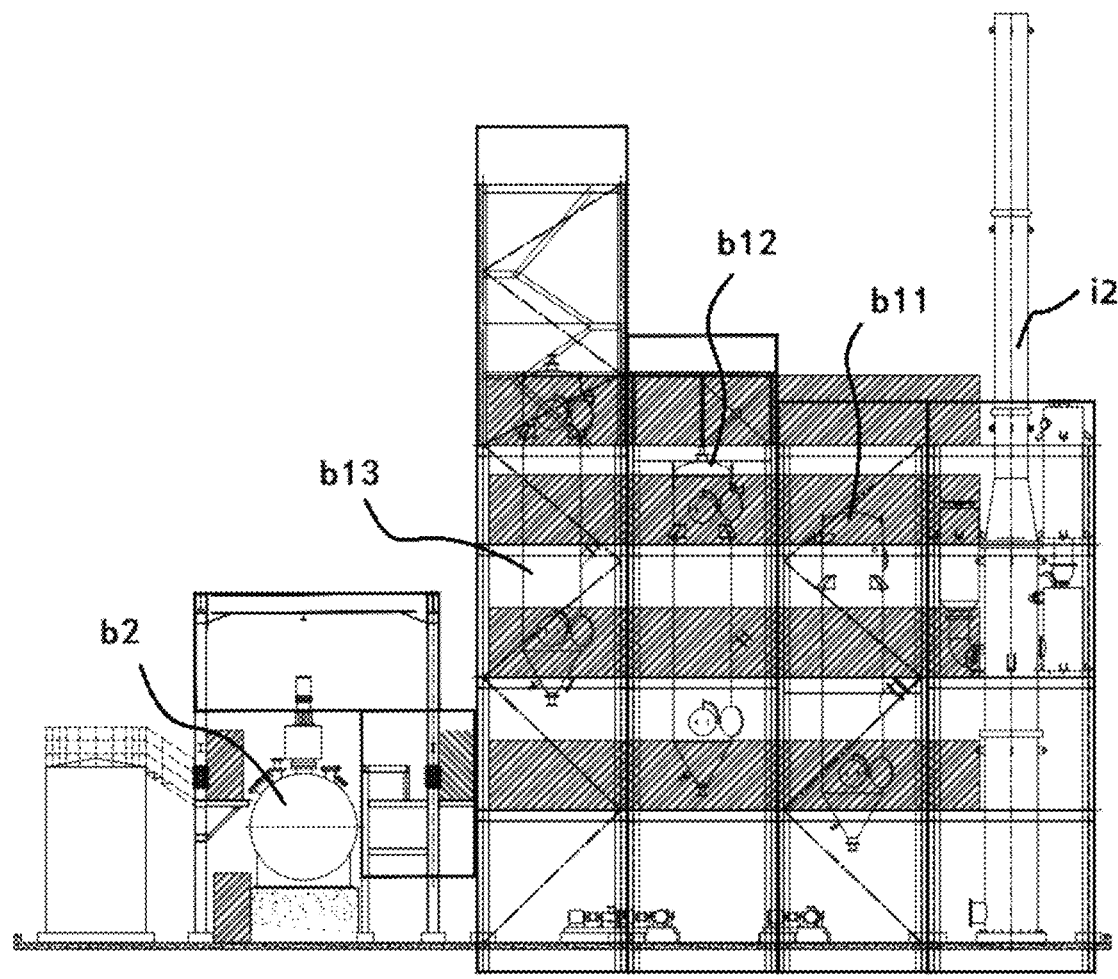
FIG. 4 is a second schematic view partially showing the leaching reaction module in the system for preparing new energy Ni—Co—Mn raw material from a laterite nickel ore according to an embodiment of the present disclosure.
Figure 5:
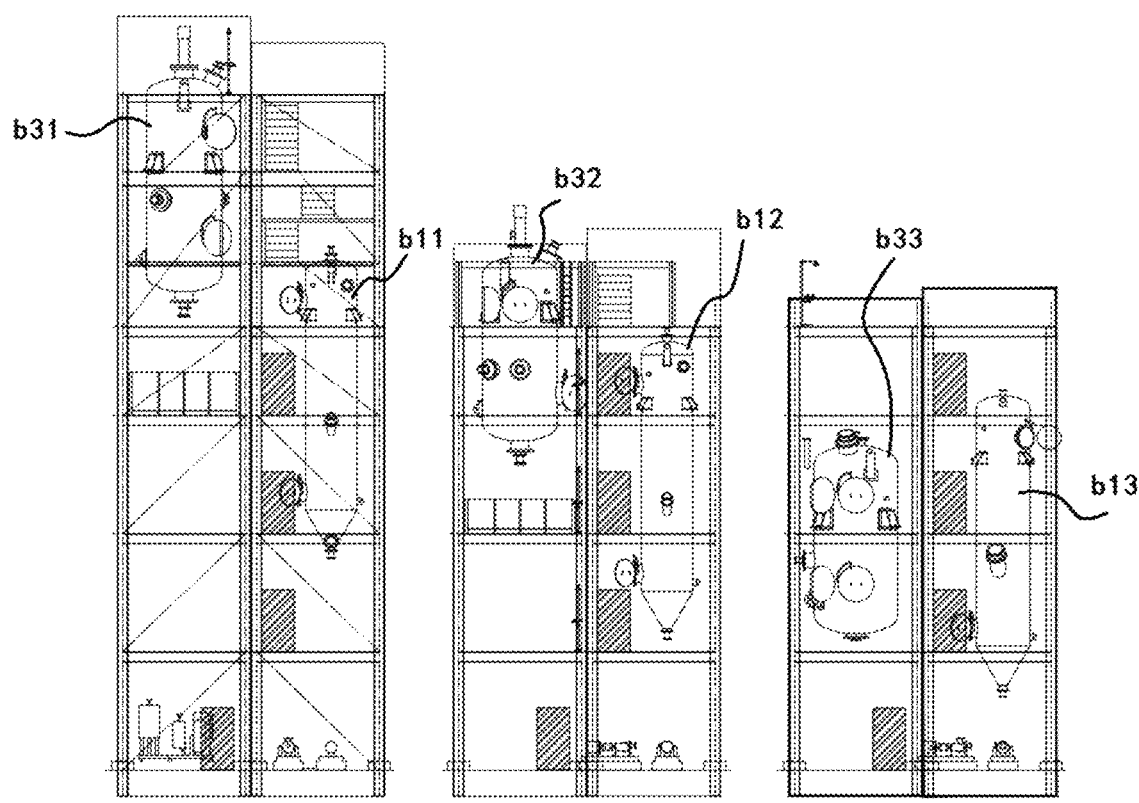
FIG. 5 is third schematic view partially showing the leaching reaction module in the system for preparing new energy Ni—Co—Mn raw material from laterite nickel ore according to an embodiment of the present disclosure.

As shown in FIG. 1 to FIG. 5, the present disclosure provides a system for preparing new energy Ni—Co—Mn raw material from laterite nickel ore. The system for preparing new energy Ni—Co—Mn raw material from laterite nickel ore includes:

A raw and auxiliary material supply module a, including an ore blending unit a1, an ore washing unit a2, an ore dressing unit a3, an ore grinding unit a4, and a concentration unit a5 connected in series, and further including a neutralizer preparation unit a6, an acid preparation unit a7, and a precipitation accelerator preparation unit a8. The ore blending unit a1 is configured to blend an ore of a required grade. The ore washing unit a2 is configured to wash the ore. The ore dressing unit a3 is configured to separate chromium iron oxides in the raw laterite nickel ore. The grinding unit a4 is configured to grind the ore into a required particle size to obtain a pulp. The concentration unit a5 is configured to concentrate the pulp. The neutralizer preparation unit a6 is configured to prepare a neutralizer required in a metallurgical process, and is generally an alkali or an alkaline substance. The acid preparation unit a7 is configured to prepare acids required in the metallurgical process, such as common acids such as sulfuric acid, hydrochloric acid, and nitric acid. The precipitation accelerator preparation unit a8 is configured to prepare the precipitation accelerator required in the metallurgical process, such as flocculant.

The leaching reaction module b, including a multi-level preheating unit b1, a high-pressure/oxygen-pressure reactor unit b2, and a multi-level flash distillation unit b3 connected in series. The multi-level preheating unit b1 is connected to the concentration unit a5, and is configured to perform a multi-level preheating on the pulp, so that a temperature of the pulp approaches a reaction temperature inside the high-pressure/oxygen-pressure reactor unit b2. The high-pressure/oxygen-pressure reactor unit b2 is further connected to the acid preparation unit a7, and to introduce acid into the high-pressure/oxygen-pressure reactor unit. A principle of the high-pressure/oxygen-pressure reactor unit b2 is to leach metal elements such as nickel, cobalt, and manganese in the pulp by using an environment of high pressure, high pressure, and strong acid. The multi-stage flash distillation unit b3 is configured to perform a multi-level pressure and temperature lowering on leach solution.

The neutralization and purification module c includes a cyclic leaching pulp neutralization unit c1. A multi-stage countercurrent washing unit c2 and a multi-stage Fe—Cr—Al removing unit c3. The cyclic leaching pulp neutralization unit c1 is connected to the multi-stage flash distillation unit b3 and the neutralizer preparation unit a6. The neutralizer prepared by the neutralizer preparation unit a6 is introduced into the cyclic leaching pulp neutralization unit c1 to neutralize excess acid in the leach solution of the multi-stage flash distillation unit b3. The multi-stage countercurrent washing unit c2 is connected to the cyclic leaching pulp neutralization unit c1, and is configured to wash the neutralized leach solution. The multi-stage Fe—Cr—Al removing unit c3 is connected to the multi-stage countercurrent washing unit c2, the cyclic leaching pulp neutralization unit c1, and the neutralizer preparation unit a6, and is configured to remove impurities from liquid phase of the leach solution washed by the multi-stage countercurrent washing unit c2. An impurity removing manner is to add the neutralizer to the liquid phase, thereby gradually increasing a pH value, and transport slag phase that is generated during removing the impurities into the multi-stage countercurrent washing unit c2 and the cyclic leaching pulp neutralization unit c1, and wash or acid leach the slag phase again.

The Ni—Co—Mn mixed hydroxide synthesis module d, including a Ni—Co—Mn mixed hydroxide multi-stage synthesis unit d1 and a Ni—Co—Mn mixed hydroxide product packaging unit d2. The Ni—Co—Mn mixed hydroxide multi-stage synthesis unit d1 is connected to the multi-stage Fe—Cr—Al removing unit c3 and the neutralizer preparation unit a6. The neutralizer is gradually added to the leach solution after removing the impurities, and to gradually increase the pH value. Nickel, cobalt, and manganese in the leach solution after removing the impurities are precipitated in a form of Ni—Co—Mn mixed hydroxide. The Ni—Co—Mn mixed hydroxide product packaging unit d2 is connected to the Ni—Co—Mn mixed hydroxide multi-stage synthesis unit d1, and is configured to clean, dry, and package the precipitated Ni—Co—Mn mixed hydroxide.

The valuable metal recovery module e, including a manganese, copper, zinc, and scandium recovery unit e1. The manganese, copper, zinc, and scandium recovery unit e1 is connected to the multi-stage Fe—Cr—Al removing unit c3 and the Ni—Co—Mn mixed hydroxide multi-stage synthesis unit d1, so as to recovery valuable metals such as manganese, copper, zinc, and scandium.

The crystal manufacturing module f, including a Ni—Co—Mn mixed salt crystal manufacturing unit f1, a nickel-salt crystal manufacturing unit f2, a cobalt-salt crystal manufacturing unit f3, and a manganese-salt crystal manufacturing unit f4. The Ni—Co—Mn mixed salt crystal manufacturing unit f1 is connected to the multi-stage Fe—Cr—Al removing unit c3 and the Ni—Co—Mn mixed hydroxide multi-stage synthesis unit d1, and is configured to extract the liquid phase to obtain a Ni—Co—Mn mixed salt crystal. The nickel-salt crystal manufacturing unit f2, the cobalt-salt crystal manufacturing unit f3, and the manganese-salt crystal manufacturing unit f4 are all connected to the multi-stage Fe—Cr—Al removing unit c3 and the Ni—Co—Mn mixed hydroxide multi-stage synthesis unit d1, and are configured to extract the liquid phase to obtain a nickel-salt crystal, a cobalt-salt crystal, and a manganese-salt crystal respectively.

It is easy to understand that the liquid phase obtained after removing impurities by the multiple-stage Fe—Cr—Al removing unit c3 can be directly used to extract, or the Ni—Co—Mn mixed hydroxide prepared by the Ni—Co—Mn mixed hydroxide multi-stage synthesis unit d1 is acid leached and then extracted. After the extraction crystallization, the Ni—Co—Mn mixed salt crystal may be obtained, or the nickel-salt crystal, the cobalt-salt crystal, and the manganese-salt crystal can be separately obtained. The Ni—Co—Mn mixed salt crystal can be directly used for preparing the ternary precursor. The nickel-salt crystal, the cobalt-salt crystal, and the manganese-salt crystal can be separately used for another using, or for preparing a ternary precursor according to a proportion.

The ternary precursor manufacturing module g includes a material preparation unit g1, a control precipitation reaction unit g2, and a ternary precursor post-processing unit g3 connected in series. The material preparation unit g1 is connected to the Ni—Co—Mn mixed salt crystal manufacturing unit f1, the nickel-salt crystal manufacturing unit f2, the cobalt-salt crystal manufacturing unit f3, and the manganese salt crystal manufacturing unit f4, and is configured to prepare a metal salt solution, an alkali liquid, and a complexing agent. The control precipitation reaction unit g2 is configured to react with the metal salt solution, the alkali solution, and the complexing agent. The ternary precursor post-processing unit g3 is configured to process the reacted material to obtain a ternary precursor product.

That is, the Ni—Co—Mn mixed salt is used as the mother liquid, and one or more of nickel salt, cobalt salt and manganese salt are added, so that a proportion of nickel, cobalt, and manganese is suitable for preparing the ternary precursor. In addition, the nickel-salt crystal manufacturing unit f2, the cobalt-salt crystal manufacturing unit f3, and the manganese-salt crystal manufacturing unit f4 can also be used to prepare the ternary precursor according to a certain proportion of the nickel-salt, the cobalt-salt, and the manganese-salt.

The ternary positive material preparation module h includes a lithium mixed charging unit h1, a high-temperature synthesis unit h2, and a ternary positive material post-processing unit h3 connected in series. The lithium mixed charging unit h1 is connected to the ternary precursor post-processing unit g3, and is configured to mix the ternary precursor product with lithium source. The high-temperature synthesis unit h2 is configured to perform a high-temperature synthesis on the mixed logistics, and the ternary cathode material post-processing unit h3 is configured to crush the material obtained after high-temperature synthesis and remove magnetic foreign material from the crushed material.

In one embodiment, the ore blending unit a1 checks a grade of the ore to match a high-grade ore with a low-grade ore, so that each batch of the grade that enters a subsequent process meets a design grade of the system. The ore washing unit a2 is configured to perform a hydraulic ore separation on the ore, and perform a preliminary ore separation according to the size. The ore unit may be one or more combinations of a trough ore washing machine and a cylinder ore washing machine. The ore dressing unit a3 is configured to remove impurities such as chromite from the mineral, so as to avoid that a hard chromite with a relatively hard texture destroys a subsequent processing device. The ore dressing unit a3 removes chromite from the mineral by using a gravity mineral processing device or a magnetic mineral processing device. The ore grinding unit a4 is configured to grind large-sized minerals so that their sizes meet subsequent process requirements. It should be understood that the ore grinding unit a4 may be one or more combinations of a crusher, a pulverizer, or a ball mill. The concentration unit a5 is generally multiple thickeners with continuous arrangements.

The neutralizer preparation unit a6 is configured to prepare a neutralizer. The neutralizer is an alkali or an alkaline substance. The neutralizer preparation unit a6 can prepare limestone slurry or limestone emulsion by using limestone. The acid preparation unit a7 may be an apparatus for preparing sulfuric acid by using a contact method or a nitrification method.

In one embodiment, the multi-level preheating unit b1 includes a first preheater b11, a second preheater b12, and a third preheater b13 connected in series. The first preheater b11 is connected to the concentration unit a5, the third preheater b13 is connected to the high-pressure/oxygen-pressure reactor unit b2, and the first preheater b11, the second preheater b12, and the third preheater b13 are configured to perform a step-by-step preheating on the pulp output from the concentration unit a5, thereby avoiding excessive single heating range and reducing equipment requirements.

Correspondingly, the multi-stage flash distillation unit b3 includes a first flash evaporator b31, a second flash evaporator b32, and a third flash evaporator b33. The first flash evaporator b31 is connected to the high-pressure/oxygen-pressure reactor unit b2. The third flash evaporator b33 is connected to the cyclic leaching pulp neutralization unit c1, and the first flash evaporator b31, the second flash evaporator b32, and the third flash evaporator b33 are configured to perform a step-by-step pressure and temperature lowering on the leach solution leached from the high-pressure/oxygen-pressure reactor unit b2, thereby avoiding excessive single heating range and reducing equipment requirements.

Preferably, the first flash evaporator b31 is connected to the third preheater b13, and is configured to preheat the pulp in the third preheater b13 by flash steam. The second flash evaporator b32 is connected to the second preheater b12, and is configured to preheat the pulp in the second preheater b12 by flash steam. The third flash evaporator b33 is connected to the first preheater b11, and is configured to preheat the pulp in the first preheater b11 by flash steam.

By connecting the first flash evaporator b31 to the third preheater b13, a temperature and a pressure of steam discharged by the first flash evaporator b31 are highest. Thus, the pulp in the third preheater b13 can be heated to a higher temperature, and the third preheater b13 can fully use heat of the leach solution entering the first flash evaporator b31. The pulp in the third preheater b13 can be heated, and the leach solution in the first flash evaporator b31 can be cooled.

By connecting the second flash evaporator b32 to the second preheater b12, a temperature and a pressure of steam discharged by the second flash evaporator b32 are medium, which is applicable to heating the pulp in the second preheater b12 to a medium temperature, and it is also convenient for the leach solution in the second flash evaporator b32 to be reduced to a medium temperature.

By connecting the third flash evaporator b33 to the first preheater b11, a temperature and a pressure of the leach solution in the third flash evaporator b33 are relatively low, and is suitable to preheat the pulp with a relatively lower temperature in the first preheater b11. Thus, the first preheater b11 can preheat the pulp in the first preheater b11 that needs to reach a relatively lower preheating temperature by using steam discharged from the first flash evaporator b31 with the relatively lower temperature. The first flash evaporator b31, the second flash evaporator b32, and the third flash evaporator b33 can assist the third preheater b13, the second preheater b12, and the first preheater b11 to preheat the pulp therein to a preset temperature.

In some embodiments, volumes of the first flash evaporator b31, the second flash evaporator b32, and the third flash evaporator b33 increases in order. Setting heights of the first flash evaporator b31, the second flash evaporator b32, and the third flash evaporator b33 decrease in order. Setting heights of the third preheater b13, the second preheater b12, and the first preheater b11 decreases in order.

Because pressures of the leach solution in the first flash evaporator b31, the second flash evaporator b32, and the third flash evaporator b33 needs to be gradually reduced, in this embodiment, the volumes of the first flash evaporator b31, the second flash evaporator b32, and the third flash evaporator b33 increase in order. Thus, the pressures of the leach solution that orderly enters thereinto can be reduced.

Because the volumes of the first flash evaporator b31, the second flash evaporator b32, and the third flash evaporator b33 increases in order, if the first flash evaporator b31, the second flash evaporator b32, and the third flash evaporator b33 are at the same height, there will be a height difference between a discharge port of the leach solution of a previous flash evaporator and a feed port of a next flash evaporator.

Thus, a connection between two adjacent flash evaporators of the first flash evaporator b31, the second flash evaporator b32 can be realized by using a bent tube. Flow of the leach solution may be prevented by using the bent tube connection, and material may be stuck at the bent tube. In this embodiment, the heights of the first flash evaporator b31, the second flash evaporator b32, and the third flash evaporator b33 are arranged from high to low, so that the discharge port of the previous flash evaporator is opposite to the feed port of the next flash evaporator, so that the leach solution of the previous flash evaporator can directly enter the next flash evaporator by using a straight tube, and no need to be connected by using the bent tube, thereby avoiding the case in which the material is stuck.

Because the setting heights of the first flash evaporator b31, the second flash evaporator b32, and the third flash evaporator b33 decrease in order, in this embodiment, the setting heights of the third preheater b13, the second preheater b12, and the first preheater b11 decrease in order. Thus, the setting heights of the third preheater b13, the second preheater b12, and the first preheater b11 can match the relative first flash evaporator b31, the second flash evaporator b32, and the third flash evaporator b33. The third preheater b13, the second preheater b12, and the first preheater b11 can conveniently use the first flash evaporator b31, the second flash evaporator b32, and the third flash evaporator of the third flash evaporator b33.

By using the foregoing three-dimensional arrangement, the vertical height can be fully utilized, on the one hand, the plant area occupied is reduced, and product output per unit area is improved. The gravity can also be fully utilized. Only by pumping the slurry into the highest tank, the slurry automatically flows to other tanks, reducing the number of arranged pumps.

In one embodiment, the multiple-segment Fe—Cr—Al removing unit c3 includes multiple segments of Fe—Cr—Al removing units connected in series, and each Fe—Cr—Al removing unit is connected to the neutralizer preparation unit a6 and the precipitation accelerator preparation unit a8, configured to neutralize and remove impurities from each Fe—Cr—Al removing unit.

A first segment of the Fe—Cr—Al removing subunit is connected to the multi-stage countercurrent washing unit c2. The first segment of the Fe—Cr—Al removing subunit is configured to perform a purification on the washed leach solution, transport the slag phase generated during the purification into the multi-stage countercurrent washing unit c2, and wash the solution contaminated with the slag phase to avoid waste. After the slag phase is neutralized, it can be discharged as the tailing slags. The remaining iron-aluminum chromium-removing subunits are connected to a cyclic leaching pulp neutralization unit c1, configured to perform another purification on the leach solution obtained from a previous Fe—Cr—Al removing subunit, and transport the slag phase generated during the purification into the cyclic leaching pulp neutralization unit c1.

A pH value of each Fe—Cr—Al subunit is gradually increased. That is, the pH value of the first segment of the Fe—Cr—Al removing subunit is the lowest. According to an experimental test, the slag phase generated by the first segment of the Fe—Cr—Al removing subunit mainly includes Fe—Cr—Al, and the Ni—Co—Mn is extremely small, and may be discarded as the tailing slag. The slag phase generated in other segments of the Fe—Cr—Al subunit not only contains Fe—Cr—Al, but also contains non-negligible Ni—Co—Mn. Discarding will cause great loss of Ni—Co—Mn. Therefore, the slag phase is introduced into the cyclic leaching pulp neutralization unit c1, and then acid leaching dissolves again. After the multi-stage impurity removal processing of the Fe—Cr—Al removing unit c3, the metal ions such as iron, aluminum, and chromium in the solution may be ignored, and the Fe—Cr—Al removing may be considered as clean.

In some embodiments, a last segment of the Fe—Cr—Al removing subunit is connected to the manganese, copper, zinc, and scandium recovery unit e1, and configured to recovery copper, zinc, and scandium elements in the purified slurry by an extraction process.

In some embodiments, the Ni—Co—Mn mixed hydroxide multi-stage synthesis unit d1 includes multiple segments of Ni—Co—Mn mixed hydroxide synthesizing subunits connected in series. Each Ni—Co—Mn mixed hydroxide synthesis subunit is connected to the neutralizer preparation unit a6 and the precipitation accelerator preparation unit a8, and is configured to synthesize Ni—Co—Mn mixed hydroxide.

A first section of the Ni—Co—Mn mixed hydroxide synthesis subunit is connected to a last section of the Fe—Cr—Al removing subunit, configured to precipitate nickel, cobalt, and manganese in the impurity-removed leach solution, and transport the generated slag phase into the crystal manufacturing module f as a raw material for preparing Ni—Co—Mn mixed salt or separately preparing nickel, cobalt, and manganese salts. The last stage of the Ni—Co—Mn mixed hydroxide synthesis subunit is connected to the cyclic leaching pulp neutralization unit c1, and configured to transport the generated slag phase into the cyclic leaching pulp neutralization unit c1, and dissolve and recovery the Ni—Co—Mn in the slag phase again. The remaining Ni—Co—Mn mixed hydroxide synthesis subunits are connected to the manganese, copper, zinc, and scandium recovery unit e1 to recovery manganese elements in the slag phase.

In some embodiments, the system further includes an environment protection and safety module i. The environment protection and safety module i includes a waste water processing unit i1. The waste water processing unit i1 is connected to a Ni—Co—Mn mixed hydroxide multi-stage synthesis unit d1, and is configured to purify waste water generated by the Ni—Co—Mn mixed hydroxide to meet a discharge standard.

The environment protection and safety module i further includes an exhaust gas processing unit i2, and the exhaust gas processing unit i2 is connected to the first preheater b11 to purify the exhaust gas generated by the first preheater b11. The acid steam generated in each flash tank is introduced into the corresponding preheater to preheat the pulp, and finally is collected and discharged into the first preheater b11, and is introduced into the exhaust gas processing unit i2 for harmless processing by tubes.

The environment protection and safety module i further includes a tailing slag processing unit i3, and the tailing slag processing unit i3 is connected to the multi-stage countercurrent washing unit c2, and configured to neutralize and discharge the tailing slags.

The environment protection and safety module i also includes the fire control unit i4 configured to provide fire control services. The fire control unit i4 includes fire control engines, fire control stations, fire hydrants and fire control network facilities, and is equipped with fire control personnel to cope with fire accidents.

The system further includes an energy supply module j. The energy supply module j includes a pure water preparation unit j2. The pure water preparation unit j2 is connected to a multi-stage countercurrent washing unit c2 and a mineral washing unit a2, and is configured to prepare external water to meet a process standard to supply water to the multi-stage countercurrent washing unit c2 and the ore washing unit a2. The energy supply module j further includes a boiler unit j3, and the boiler unit j3 is connected to the pure water preparation unit j2 and the high-pressure/oxygen pressure reactor unit b2, and configured to provide high-pressure steam to the high-pressure/oxygen pressure reactor unit b2.

The energy supply module j further includes a power distribution unit j1, and the power distribution unit j1 is connected to other units to provide electric energy.

The energy supply module j also includes the DCS integrated control unit j4. The DCS integrated control unit j4 is connected with other units to monitor and control a working status of each module unit, and control the production, process, logistics information, safety and environmental protection indexes of the whole factory. It is easy to think that the power distribution unit j1 also supplies power to the DCS integrated control unit j4.

It should be understood that in this application, all steps in which slurry delivery needs to be performed may be delivered by using a slurry pump, a transport pump, or the like. It should be understood that in this application, all references to ferroaluminum chromium nickel cobalt manganese refer to a compound that includes the metal element or a solution that includes the metal element ion, and are not metal monomers.

The percentage of each module in the system to the total area is shown in the following table:

| Module | Percentage |
| --- | --- |
| Raw auxiliary material supply module | 26% |
| Leaching reaction module | 5% |
| Neutralization and purification module | 11% |
| Ni—Co—Mn mixed hydroxide synthesis module | 3% |
| Valuable metal recovery module | 5% |
| Crystal manufacturing module | 2% |
| Ternary precursor manufacturing module | 1% |
| Ternary positive electrode material preparation module | 1% |
| Environmental protection and safety module | 6% |
| Energy supply module | 4% |

This system adopts the modular, three-dimensional and compact design idea to optimize the layout of the factory area, reduce the area occupied by the factory area, and increase the output of the single-side area as much as possible. At the same time, a variety of modules are properly arranged to reduce the total length of various pipelines, thereby reducing the total energy consumption used for pumping and making the process flow irreversible. For some modules, a three-dimensional design is adopted to fully use gravity to drive liquid flow and reduce the number of drive pumps. In addition, the modules are arranged neatly and neatly, and the road design is optimized, so that the vehicle is diverted and materials are transported smoothly.

In an embodiment, the total area of the plant area is 70.4 hectares, and the total investment is US $1.6 billion. Annual ore processing 2280 10,000 tons, with an annual output of 126,000 tons of nickel metal. The ore used for production has a water content of about 40% and a grade of 1%. The nickel extraction rate is 92%. Based on the price of $20,000/ton of nickel, the annual output value is $25.2 billion. The investment strength reaches $2273 million/hectare, or RMB160 million/hectare. The land output rate reaches $3580 million/hectare, or RMB260 million/hectare. According to the revised Land Control Index for Industrial Projects released by the Natural Resources Department on June 25, the fixed asset investment strength control value (RMB 10,000/hectare), the 32-item non-ferrous metal smelting and calendaring industry, the first, second, third and fourth etc., are greater than RMB 3885 million/hectare, and the international reference value of land yield control index is 90 million/hectare. Obviously, in this embodiment, the investment intensity is far beyond the national standard, and the land output rate is far beyond the international reference value, reaching the international leading level.

The present disclosure overcomes a disadvantage of the prior art and a process. A green technology and a process for simultaneously extracting nickel and cobalt and manganese from a low-grade laterite nickel ore are not only used to simultaneously and efficiently extract nickel and cobalt and manganese, but also a green technology and a clean production process for energy saving and emission reduction are used to effectively and safely dispose of waste water, waste residue, and waste gas. The present disclosure has energy saving and carbon reducing and pollution reduction, and implements maximum comprehensive recovery of nickel and cobalt and manganese, effectively resolves a contradiction between a requirement of a new energy source and a scarce resource of nickel and manganese strategy, and completely meets a global green development and a dual-carbon economic trend.

The foregoing descriptions are merely preferred specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. A system for preparing Ni-Co-Mn raw material from laterite nickel ore, comprising:
    a raw auxiliary material supply module, comprising an ore blending unit, an ore washing unit, an ore dressing unit, an ore grinding unit, and a concentration unit connected in series, and further comprising a neutralizer preparation unit, an acid preparation unit, and a precipitation accelerator preparation unit, wherein the ore blending unit is configured to blend an ore of a required grade, the ore washing unit is configured to wash the ore, the ore dressing unit is configured to separate chromium iron oxide from the ore, the grinding unit is configured to grind the ore into a required particle size to obtain a pulp, and the concentration unit is configured to concentrate the pulp;
    a leaching reaction module, comprising a multi-level preheating unit, a high-pressure/oxygen-pressure reactor unit, and a multi-level flash distillation unit connected in series, wherein the multi-level preheating unit is connected to the concentration unit and configured to perform a multi-level preheating on the pulp, the high-pressure/oxygen-pressure reactor unit is further connected to the acid preparation unit and configured to leach minerals in the pulp, and the multi-level flash distillation unit is configured to perform a multi-level pressure and temperature lowering on leach solution;
    a neutralization and purification module, comprising a cyclic leaching pulp neutralization unit, a multi-stage countercurrent washing unit and a multi-segment Fe-Cr-Al removing unit, wherein the cyclic leaching pulp neutralization unit is connected to the multi-stage flash distillation unit and the neutralizer preparation unit, and is configured to neutralize the leach solution of the multi-stage flash distillation unit; the multi-stage countercurrent washing unit is connected to the cyclic leaching pulp neutralization unit, and is configured to wash the neutralized leach solution; and the multi-segment Fe-Cr-Al removing unit is connected to the multi-stage countercurrent washing unit, the cyclic leaching pulp neutralization unit, and the neutralizer preparation unit, and is configured to remove impurities from the washed leach solution, and transport slag phase generated during removing the impurities into the multi-stage countercurrent washing unit and the cyclic leaching pulp neutralization unit;

a Ni—Co—Mn mixed hydroxide synthesis module, comprising a Ni—Co—Mn mixed hydroxide multi-stage synthesis unit and a Ni—Co—Mn mixed hydroxide product packaging unit, wherein the Ni—Co—Mn mixed hydroxide multi-stage synthesis unit is connected to the multi-segment Fe—Cr—Al removing unit and the neutralizer preparation unit, and is configured to precipitate nickel, cobalt, and manganese from the leach solution that has been purified by the multi-segment Fe—Cr—Al removing unit; the Ni—Co—Mn mixed hydroxide product packaging unit is connected to the Ni—Co—Mn mixed hydroxide multi-stage synthesis unit, and is configured to package the precipitate; and a valuable metal recovery module, comprising a manganese, copper, zinc, and scandium recovery unit, and the manganese, copper, zinc, and scandium recovery unit is connected to the multi-segment Fe—Cr—Al removing unit and the Ni—Co—Mn mixed hydroxide multi-stage synthesis unit, and configured to recover valuable metals comprising manganese, copper, zinc, and scandium;

a crystal manufacturing module, comprising a Ni—Co—Mn mixed salt crystal manufacturing unit, a nickel-salt crystal manufacturing unit, a cobalt-salt crystal manufacturing unit, and a manganese-salt crystal manufacturing unit, wherein the Ni—Co—Mn mixed salt crystal manufacturing unit is connected to the multi-segment Fe—Cr—Al removing unit and the Ni—Co—Mn mixed hydroxide multi-stage synthesis unit, and is configured to extract liquid phase to obtain a Ni—Co—Mn mixed salt crystal, wherein the nickel-salt crystal manufacturing unit, the cobalt-salt crystal manufacturing unit, and the manganese-salt crystal manufacturing unit are connected to the multi-segment Fe—Cr—Al removing unit and the Ni—Co—Mn mixed hydroxide multi-stage synthesis unit, and are configured to extract the liquid phase to obtain a nickel-salt crystal, a cobalt-salt crystal, and a manganese-salt crystal;

a ternary precursor manufacturing module, comprising a material preparation unit, a control precipitation reaction unit, and a ternary precursor post-processing unit connected in series, wherein the material preparation unit is connected to the Ni—Co—Mn mixed salt crystal manufacturing unit, the nickel-salt crystal manufacturing unit, the cobalt-salt crystal manufacturing unit, and the manganese-salt crystal manufacturing unit, and is configured to prepare a metal salt solution, an alkali liquid, and a complexing agent, the control precipitation reaction unit is configured to control the metal salt solution, the alkali liquid, and the complexing agent to react together and form a reacted material, and the ternary precursor post-processing unit is configured to process the reacted material to obtain a ternary precursor product; and a ternary positive material preparation module, comprising a lithium mixed charging unit, a high-temperature synthesis unit, and a ternary positive material post-processing unit connected in series, wherein the lithium mixed charging unit is connected to the ternary precursor post-processing unit, and is configured to mix the ternary precursor product with lithium source, the high-temperature synthesis unit is configured to perform a high-temperature synthesis on the mixed material, and the ternary positive material post-processing unit is configured to crush the material obtained after high-temperature synthesis and remove magnetic foreign material from the crushed material.

2. The system for preparing Ni—Co—Mn raw material from laterite nickel ore of claim 1, wherein the multi-level preheating unit comprises a first preheater, a second preheater, and a third preheater connected in series, wherein the first preheater is connected to the concentration unit, the third preheater is connected to the high-pressure/oxygen-pressure reactor unit, and the first preheater, the second preheater, and the third preheater are configured to perform a step-by-step preheating on the pulp output from the concentration unit.

3. The system for preparing Ni—Co—Mn raw material from laterite nickel ore of claim 2, wherein the multi-level flash distillation unit comprises a first flash evaporator, a second flash evaporator, and a third flash evaporator, wherein the first flash evaporator is connected to the high-pressure/oxygen-pressure reactor unit, the third flash evaporator is connected to the cyclic leaching pulp neutralization unit, and the first flash evaporator, the second flash evaporator, and the third flash evaporator are configured to perform a step-by-step pressure and temperature lowering on the leach solution leached from the high-pressure/oxygen-pressure reactor unit.

4. The system for preparing Ni—Co—Mn raw material from laterite nickel ore of claim 3, wherein the first flash evaporator is connected to the third preheater, and configured to preheat the pulp in the third preheater by flash steam; and the second flash evaporator is connected to the second preheater, and configured to preheat the pulp in the second preheater by flash steam, and the third flash evaporator is connected to the first preheater and configured to preheat the pulp in the first preheater by flash steam.

5. The system for preparing Ni—Co—Mn raw material from laterite nickel ore of claim 4, wherein volumes of the first flash evaporator, the second flash evaporator, and the third flash evaporator increase in order, and installation elevations of the first flash evaporator, the second flash evaporator, and the third flash evaporator decreases in order; and installation elevations of the third preheater, the second preheater, and the first preheater decreases in order.

6. The system for preparing Ni—Co—Mn raw material from laterite nickel ore of claim 5, wherein the multi-segment Fe—Cr—Al removing unit comprises a plurality of Fe—Cr—Al removing subunits connected in series, each Fe—Cr—Al removing subunit is connected to the neutralizer preparation unit, and configured to neutralize and remove the impurities for each Fe—Cr—Al removing subunit, wherein the first one of the Fe—Cr—Al removing subunits is connected to the multi-stage counter-current washing unit, and configured to perform a purification on the washed leach solution, and transport the slag phase generated during the purification into the multi-stage countercurrent washing unit; and the others of Fe—Cr—Al removing subunits are connected to the cyclic leaching pulp neutralization unit, and configured to perform another purification on the leach solution obtained from a previous Fe—Cr—Al removing subunit, and transport the slag phase generated during the purification into the cyclic leaching pulp neutralization unit.

7. The system for preparing Ni—Co—Mn raw material from laterite nickel ore of claim 6, wherein pH values between the adjacent Fe—Cr—Al removing subunits are sequentially increased.

8. The system for preparing Ni—Co—Mn raw material from laterite nickel ore of claim 6, wherein the last one of the Fe—Cr—Al removing subunits is connected to the manganese, copper, zinc, scandium recovery unit for recovering copper, zinc, and scandium elements in purified slurry.

9. The system for preparing Ni—Co—Mn raw material from laterite nickel ore of claim 6, wherein the Ni—Co—Mn mixed hydroxide multi-stage synthesis unit comprises a plurality of Ni—Co—Mn mixed hydroxide synthesis subunits connected in series, each Ni—Co—Mn mixed hydroxide synthesis subunit is connected to the neutralizer preparation unit, the first one of the Ni—Co—Mn mixed hydroxide synthesis subunits is connected to the last one of the last one of the Fe—Cr—Al removing subunits, and is configured to precipitate nickel, cobalt, and manganese in the purified leach solution, and transport generated slag phase into the crystal manufacturing module, and the last one of the Ni—Co—Mn mixed hydroxide synthesis subunits is connected to the neutralizer preparation unit, and is configured to transport the generated slag phase into the neutralizer preparation unit, the others of the Ni—Co—Mn mixed hydroxide synthesis subunits are connected to the manganese, copper, zinc, and scandium recovery unit, and configured to recycle manganese elements in the slag phase.

10. The system for preparing Ni—Co—Mn raw material from laterite nickel ore of claim 9, further comprising an environmental protection and safety module, wherein the environmental protection and safety module comprises a waste water processing unit connected to the Ni—Co—Mn mixed hydroxide multi-stage synthesis unit, and configured to purify waste water generated by the Ni—Co—Mn mixed hydroxide multi-stage synthesis unit.

11. The system for preparing Ni—Co—Mn raw material from laterite nickel ore of claim 10, wherein the environment protection and safety module further comprises an exhaust gas processing unit, and the exhaust gas processing unit is connected to the first preheater, and is configured to purify exhaust gas generated by the first preheater.

12. The system for preparing Ni—Co—Mn raw material from laterite nickel ore of claim 10, wherein the environment protection and safety module further comprises a tailing slag processing unit connected to the multi-stage countercurrent washing unit for neutralizing tailing slag.

13. The system for preparing Ni—Co—Mn raw material from laterite nickel ore of claim 10, wherein the environmental protection and safety module further comprises a fire protection unit configured to provide a fire protection service.

14. The system for preparing Ni—Co—Mn raw material from laterite nickel ore of claim 1, further comprising an energy supply module, wherein the energy supply module comprises a pure water preparation unit, and the pure water preparation unit is connected to the multi-stage countercurrent washing unit and the ore washing unit, and configured to supply water to the multi-stage countercurrent washing unit and the ore washing unit.

15. The system for preparing Ni—Co—Mn raw material from laterite nickel ore of claim 14, wherein the energy supply module further comprises a boiler unit, the boiler unit is connected to the high-pressure/oxygen-pressure reactor unit, and configured to provide high pressure steam to the high-pressure/oxygen-pressure reactor unit.

16. The system for preparing Ni—Co—Mn raw material from laterite nickel ore of claim 14, wherein the energy supply module further comprises a distribution unit connected to the other units to provide electrical energy.

* * * * *